United States Patent [19]

Huguenin et al.

[11] Patent Number: 5,202,692
[45] Date of Patent: * Apr. 13, 1993

[54] MILLIMETER WAVE IMAGING SENSORS, SOURCES AND SYSTEMS

[75] Inventors: Richard G. Huguenin, South Deerfield; Paul F. Goldsmith, Leverett; Naresh C. Deo, Conway; David K. Walker, Northfield, all of Mass.

[73] Assignee: Millitech Corporation, South Deerfield, Mass.

[*] Notice: The portion of the term of this patent subsequent to Mar. 19, 2007 has been disclaimed.

[21] Appl. No.: 686,841

[22] Filed: Apr. 17, 1991

Related U.S. Application Data

[63] Continuation of Ser. No. 194,774, May 17, 1988, abandoned, which is a continuation-in-part of Ser. No. 874,461, Jun. 16, 1986, Pat. No. 4,940,986, and a continuation-in-part of Ser. No. 117,600, Nov. 6, 1987, Pat. No. 4,910,523, and a continuation-in-part of Ser. No. 183,215, Apr. 19, 1988, Pat. No. 4,901,084.

[51] Int. Cl.⁵ .................... G01S 13/89; H01L 27/146
[52] U.S. Cl. .................... 342/179; 250/332; 342/351
[58] Field of Search ............... 392/179, 351; 250/330, 250/332

[56] References Cited

U.S. PATENT DOCUMENTS

| | | | |
|---|---|---|---|
| 3,746,454 | 7/1973 | Pace et al. | 250/332 X |
| 4,164,740 | 8/1979 | Constant | 342/179 X |
| 4,515,471 | 5/1985 | Eden | 356/5 |
| 4,611,912 | 9/1986 | Falk et al. | 356/28.5 X |
| 4,893,923 | 1/1990 | Javan | 356/5 X |

OTHER PUBLICATIONS

Korzeniowski et al "Imaging System at 94 6 Hz Using Tapered Slot Antenna Elements", *Eighth IEEE Int'l Conf on Infrared and Millimeter Waves* (1983).

Yngvesson et al, "Millimeter Wave Imaging System with an Endfire Receptor Array", *Tenth Int'l Conf. on Infrared and Millimeter Waves* (1981).

Yngvesson, "Imaging Front-End Systems for Millimeter Waves and Sub-Millimeter Waves," *SPIE Conf. on Submillimeter Spectroscopy*, (1985).

Johansson et al "Millimeter Imaging Systems with an Endfire Receptor Array" 15th European Microwave Conference.

(List continued on next page.)

*Primary Examiner*—Gilberto Barrón, Jr.
*Attorney, Agent, or Firm*—Pennie & Edmonds

[57] ABSTRACT

A millimeter wave imaging system is disclosed which has wide applicability throughout transportation and related industries. For example, the system may be used to provide an aircraft pilot with an image of a landing field which is essentially unaffected by fog, rain, snow, blowing sand, etc. The system comprises an array of imaging elements as its fundamental component. Each of the imaging elements of the basic array comprises an antenna consisting of a pair of conductive elements and a non-linear circuit element connected thereacross. A image can then be formed responsive to millimeter-wave radiation without complex processing steps or any form of mechanical or electronic scanning.

To increase the sensitivity of the imaging array system, a local oscillator signal may be mixed with the energy received from the field of view in each of the imaging elements by the non-linear circuit element. The oscillator used to provide the local oscillator signal can also be used to illuminate the field of view. Coded beacons emitting encoded millimeter wave energy for detection by the imaging array may also be employed.

19 Claims, 7 Drawing Sheets

OTHER PUBLICATIONS

J. F. Johansson, "Millimeter Wave Imaging—Theory and Experiments", *Research Report No. 151*, Chalmers University, May 1986.

K. S. Yngvesson et al., "Endfire Tapered Slot Antennas on Dielectric Substrates", *IEEE Transactions on Antennas and Propagation*, vol. AP-33, No. 12, Dec. 1985, pp. 1392–1400.

K. S. Yngvesson et al., "A New Integrated Slot Element Feed Array for Multi-Beam Systems", *IEEE Transactions Antennas and Propagation*, vol. AP-34, No. 11, Nov. 1986, pp. 1372–1376.

A. Skalare et al., "Integrated Slot Line Antenna with SIS Mixer for Focal Plane Array Applications," *Proc. 17th European Microwave Conference*, Rome Italy, Sep. 1987, pp. 1–5.

J. F. Johnansson, "A Moment Method Analysis of Linearly Tapered Slot Antennas", *Research Report No. 160*, Chalmers University, Aug. 1988.

J. F. Johansson, "Theoretical Limits for Aperture Efficiency in Multi-Beam Antenna Systems", *Research Report No. 161*, Chalmers University, Aug. 1988.

K. S. Yngvesson, et al., "Realizable Feed-Element Patterns and Optimum Aperture Efficiency in Multi-Beam Antenna Systems", *IEEE Transactions on Antennas and Propagation*, Nov. 1988.

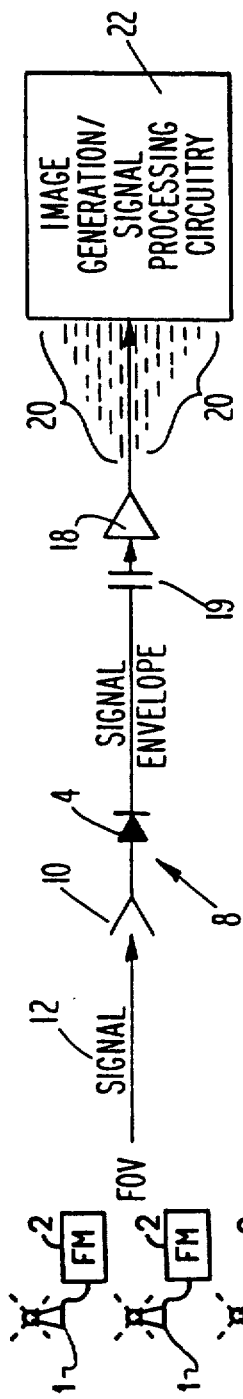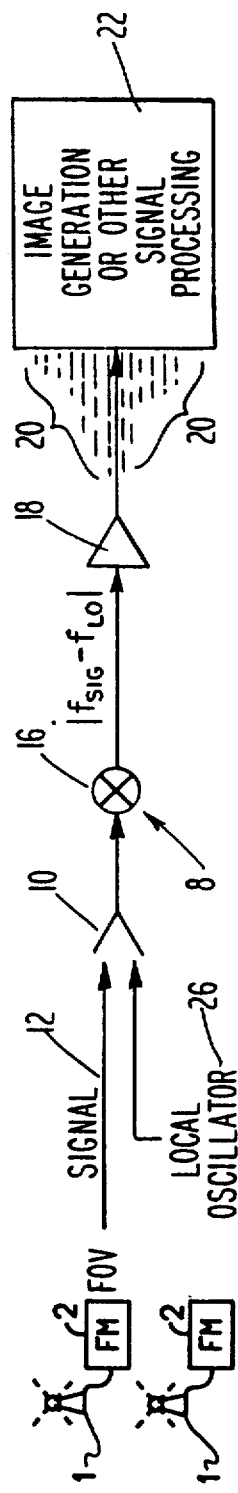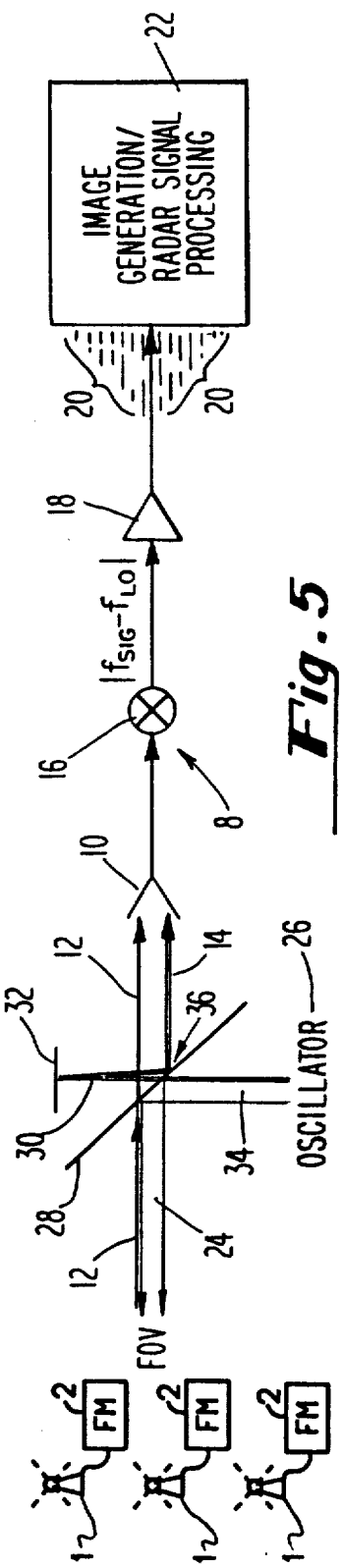

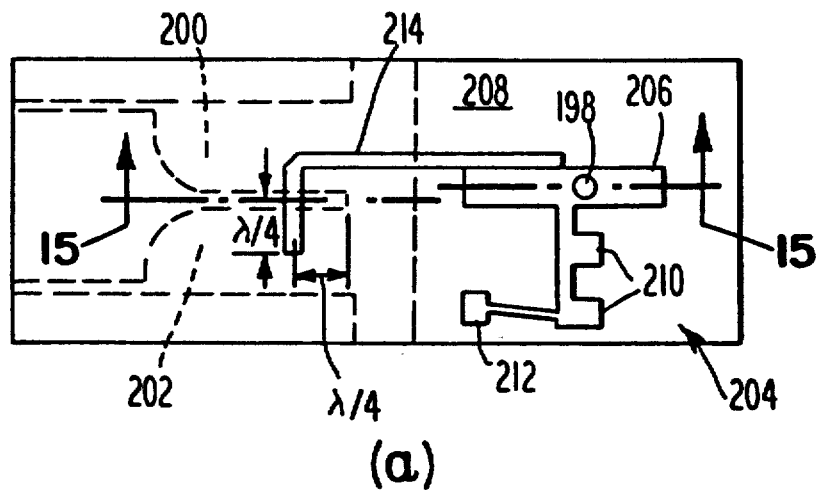
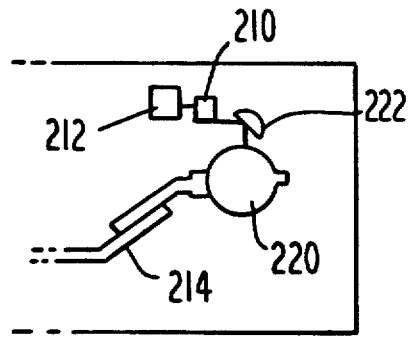
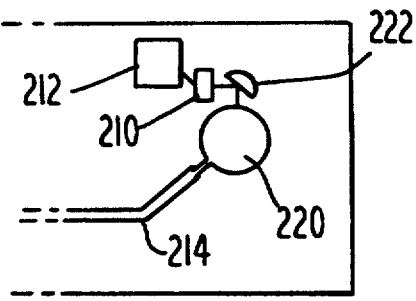
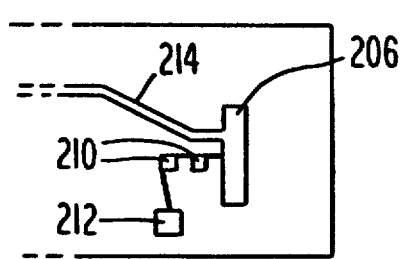
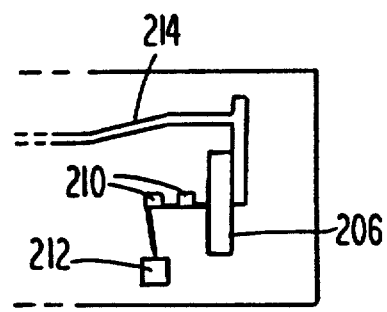
Fig. 14

MILLIMETER WAVE IMAGING SENSORS, SOURCES AND SYSTEMS

CROSS-REFERENCE TO RELATED APPLICATIONS

This is a continuation of application Ser. No. 07/194,774, filed May 17, 1988, now abandoned. Which application is a continuation-in-part of Ser. No. 06/874,461, filed Jun. 16, 1986, now U.S. Pat. No. 9,940,986 of Ser. No. 07/117,600, filed Nov. 6, 1987, now U.S. Pat. No. 4,910,523 and of Ser. No. 07/183,215, filed Apr. 19, 1988, now U.S. Pat. No. 4,901,084.

FIELD OF THE INVENTION

This invention relates generally to millimeter wave imaging sensors, millimeter wave sources, and systems employing these elements.

BACKGROUND OF THE INVENTION

It is known that millimeter waves penetrate numerous adverse environments which are not transparent to optical or infrared rays. For example, millimeter waves penetrate fog, snow, blowing dust and sand, smoke, clouds of chemical gases, and other atmospheric constituents which absorb visible and infrared radiation, and therefore prevent image formation using systems operated at these wavelengths. For example, fog currently prevents landing of airplanes, simply because there is available no imaging technology enabling pilots to see the ground in fog. This is obviously highly inconvenient.

There are numerous other applications where it would be highly desirable to have a sensor not affected by these atmospheric constituents. For example, the rescue of an airman forced to eject from his aircraft over water, or of a capsized sailor, is very difficult in fog. Radio frequency beacons can be used to provide a rough position signal, but the wavelengths of such systems are so long that it is impossible to precisely locate an individual beacon with accuracy sufficient to rescue the individual. That is, a radio frequency beacon can be used to provide a "fix", but this is only sufficient to bring a rescue craft within visible range; hence such a system is only effective on clear days.

It is well known of course that microwaves penetrate fog, dust, smoke, etc. generally as do millimeter waves. However, the wavelengths employed by conventional microwave equipment are in general too long to provide accurate imaging using components of practical size. Similarly, microwave sources and detectors are physically so large that microwave equipment is not suitable for numerous airborne and other applications where size and weight are critical.

Thus, while visible and infrared wavelengths are short enough to permit generation of an accurate image of a field of view, radiation in these bands is significantly attenuated by common atmospheric constituents, limiting the utility of such imaging systems. Lower frequency radiation such as radiofrequency energy and microwaves which are not attenuated by these constituents are of such long wavelengths as to be incapable of forming images, or require impractically large components, or both.

Millimeter waves (typically 1 cm-1 mm wavelength, and 30-300 GHz frequency) are between the microwave and infrared radiation bands, and combine some of the advantages of both. Millimeter waves are attenuated by the common atmospheric constituents listed above, but only to a limited degree, such that image formation is possible under circumstances which prevent operation of visible-frequency or infrared systems. Millimeter waves are also of sufficiently short wavelengths that an accurate image of a field of view can be formed using components of sizes convenient to be carried by aircraft, spacecraft, satellites, and so on.

One reason why millimeter wave imaging systems have not heretofore been provided is because prior to the present invention (and those described in the related applications referred to above) there has been provided no teaching of practical components for detecting millimeter wave energy emitted by or reflected from objects in a field of view which are suitable for forming an image.

There are two principal types of array useful for forming images of objects in a field of view. These are staring sensor arrays, consisting of aperture-plane and focal-plane sensor arrays, and scanned-sensor systems. Scanned-sensor systems include conventional television cameras (in which an electron beam is electronically deflected to scan a photosensitive image-forming screen in raster fashion), systems in which a single sensor is mechanically scanned to "sweep" across the field of view (such as conventional radar systems), and phased-array radar systems (in which the phase of a source of energy directed into the field of view is varied, such that the phase of energy reflected from objects in the field of view can be employed to determine their relative positions).

Each of these "scanning-sensor" systems has inherent defects or limitations which prevent or limit its effective employment in millimeter-wave imaging systems. Photosensitive elements responsive to millimeter waves have not been developed, so conventional television camera technology is unavailing. Mechanical scanning involves significant complexity, and limits the rate at which information can be gathered from the field of view. Phased-array techniques also are very complex to implement effectively, especially at millimeter-wave frequencies.

The alternative to a scanned-sensor system is a staring-sensor system, in which discrete imaging elements are provided to form separate picture elements ("pixels") of the image. As mentioned, these fall into two classes: aperture-plane arrays and focal-plane arrays. The Very Large Array radio telescope installed in New Mexico is an example of an aperture-plane array device. The sheer complexity of such instruments prevents their use in aircraft, for example. Furthermore, the signals received by each of the detectors in the array must be extensively computer-processed to yield the image, so that a real-time image cannot be formed.

A focal-plane array is a second type of staring sensor, and that which is employed according to the present invention. As used herein, the term "focal-plane array" refers to an imaging sensor system in which a lens or equivalent focusing element is used to focus the energy from the field of view onto an array of imaging elements, and in which different imaging elements correspond to different portions of the field of view and thus to the corresponding pixels of the ultimate image. An ordinary still camera can be considered a focal plane array imaging system, in that the film is disposed in the focal plane of the lens and directly records the image. Another type of focal plane array is employed in socalled CCD video cameras, in which a planar array of individual charge-coupled-device (CCD) elements, each generating a pixel of the image, is disposed in the focal plane of an optical lens. However, there have not been developed any CCD focal plane arrays or film suitable for imaging millimeter wave radiation.

Proposals have been made for focal-plane arrays of a limited number of sensing elements responsive to millimeter waves. For example, see Yngvesson, "Near-Millimeter Imaging with Integrated Planar Receptors: General Requirements and Constraints", in *Infrared and Millimeters Waves*, vol. 10, pp. 91-110 (1983); Yngvesson, "Imaging Front-End Systems for Millimeter Waves and Submillimeter Waves", *SPIE Conf. on Submillimeter Spectroscopy* (1985); and Korzeniowski et al., "Imaging System at 94 GHz using Tapered Slot Antenna Elements", *Eighth IEEE Int'l Conf. on Infrared and Millimeter Waves*, 1983.

These papers discuss millimeter wave imaging generally, and suggest systems in which energy from the field of view is coupled to an array of detector elements. These detector elements may each consist of a pair of "Vivaldi", i.e. exponentially-tapered, antenna members, with a diode detector coupled thereacross. See FIGS. 7 and 8 of the *Infrared and Millimeter Waves* paper. Yngvesson suggests in the first paragraph on the second page of the SPIE paper that prime-focus or offset paraboloids or Cassegrain-telescope reflectors are the principal choices for focusing elements. Lenses are discussed as secondary elements on page 4 of this paper.

Yngvesson suggests in the SPIE paper that the local oscillator signal can be injected through a hole in the reflector. This involves very substantial constraints on the design of the system, particularly with respect to uniform illumination of the array. In the Korzeniowsky et al. paper, a lens-imaging system is shown in FIG. 1, but no mention is made of the local oscillator signal.

It can therefore be seen that there is a distinct need in the art for a millimeter wave sensor capable of detecting millimeter wave radiation reflected from or emitted by an object in its field of view and suitable for providing an image signal essentially in real time, that is, without requiring extensive processing, and wherein each pixel of the image signal corresponds to one of the imaging elements of the sensor array. Such, a sensor would have numerous applications throughout numerous fields including transportation, surveillance, and mapping. For example, a millimeter wave imaging-sensor system, optionally employed in combination with millimeter-wave landing lights or runway beacons, could be used to provide a video picture of an airport runway to a pilot attempting to land an airplane in fog. Millimeter wave sensors of this type could also be used to provide an additional level of security at airports and the like, such that objects invisible to x-ray inspection devices currently used could be imaged; such a system could be used to interdict drug shipments and perhaps also for plastic weapon detection. Other uses of the millimeter wave imaging sensor systems are discussed below.

SUMMARY OF THE INVENTION

The present invention comprises a millimeter wave imaging sensor which in its simplest embodiment consists of a lens and an array of imaging elements. Each element of the array comprises an antenna, consisting of a balanced pair of conductive elements, and a non-linear circuit element such as a diode connected across the conductive elements. The antennas detect millimeter-wave energy reflected from or emitted by objects in the sensor's field of view, and the diodes rectify the detected energy, providing lower-frequency signals which can readily be combined to form an image. Each of the imaging elements of the sensor corresponds to a pixel of the ultimate image, such that a true focal plane array is thus provided.

In the simplest application of this sensor, each imaging element simply provides an output signal responsive to millimeter wave energy emitted by objects in the corresponding portion of the field of view. These signals can be employed to form a "radiometric" image of the scene. This could be used for example to generate a video image of the ground over which an aircraft is flying at any particular time. Alternatively, the output signal of each sensing element can be integrated over a period of time and used to form a "still" image, as in a time exposure made using a still camera.

If increased sensitivity is required, a local oscillator signal can be mixed with the incoming radiation in each of the antenna elements, thus substantially improving the signal-to-noise ratio of the detectors in a "superheterodyne" arrangement. The source of the local oscillator signal or a second source can also be employed to illuminate the field of view, for further sensitivity. The frequency of the illumination and local oscillator signals can also be varied with time, for object detection and ranging purposes. A corresponding image can be formed using conventional processing techniques.

In certain system applications, millimeter-wave sources in the field of view can also be employed, and their emitted signals may be modulation "encoded" for various purposes. For example, runway lights can be amplitude-modulated, e.g. by sine-waves, to enable a sensor carried by an aircraft to differentiate them from one another. An image corresponding to the pilot's "clear night" image of the airport can then be provided. Airmen and sailors may be provided with millimeter-wave emergency position-indicating beacons (EPIRBs) comprising millimeter-wave sources modulated according to a known pattern, to improve battery life and improve signal-to-noise ratio. Fixed objects (such as the tops of tall buildings, bridges, lighthouses and the like) can be lighted with encoded millimeter wave sources as navigational aids. In general, wherever lighting is normally provided to enable nocturnal operations, a millimeter-wave source according to the invention may profitably be added. In each case, use of millimeter-wave sources and detectors according to the invention eliminates interference with normal operations due to fog, snow, rain, blowing sand, etc.

BRIEF DESCRIPTION OF THE DRAWINGS

The invention will be better understood if reference is made to the accompanying drawings, in which:

FIG. 3 shows schematically the signal path provided by a single element of the antenna/detector array of the invention;

FIG. 4 shows schematically the signal path in a "superheterodyne" embodiment of the mixer/detector array of the invention;

FIG. 5 shows schematically the signal path in an "illuminating superheterodyne" embodiment of the mixer/detector array of the invention;

FIG. 14, comprising FIGS. 14(a)–(e), shows integrated circuit embodiments of millimeter wave sources which can be employed in connection with the invention.

DESCRIPTION OF THE PREFERRED EMBODIMENTS

As indicated above, this application relates to a millimeter wave imaging sensor, comprising an array of detectors disposed in the focal plane of an optical system for receiving millimeter wave energy from the field of view and for providing output signals which can be used to form an image corresponding to the millimeter wave energy received from the field of view. A basic "building block" sensor array according to the invention is described first. Several different embodiments of the sensor in combination with other devices are then described. Various systems employing the sensors of the invention are then described.

Figure 1:
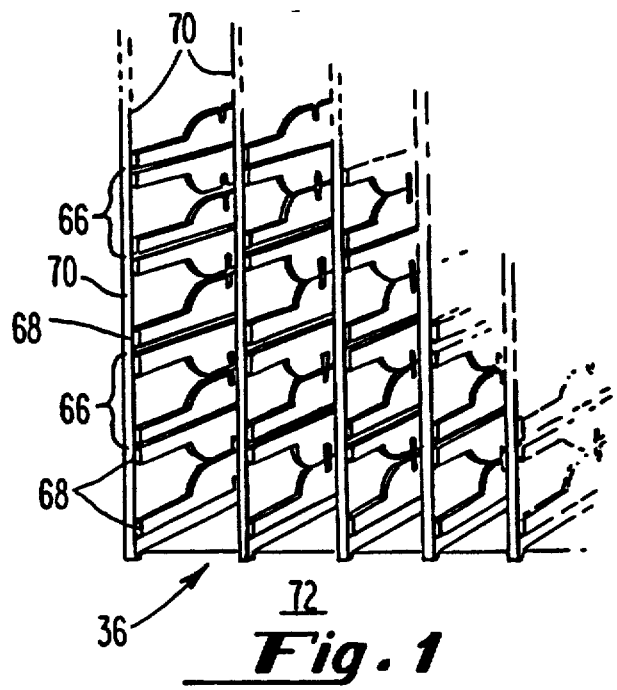
FIG. 1 shows a perspective view of a portion of the antenna/detector array of the invention.
Figure 2:
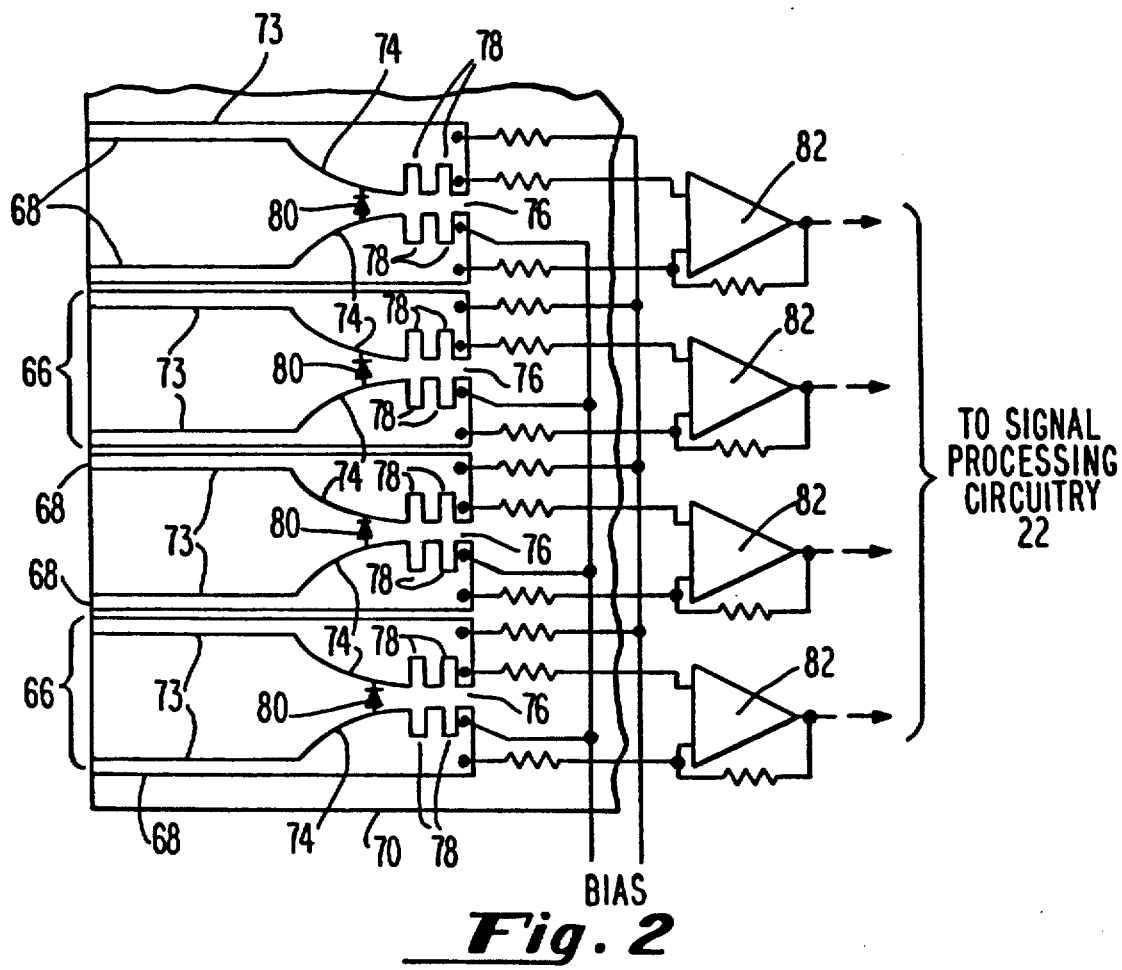
FIG. 2 shows a plan view of a portion of one of the "panels" of the antenna/detector array of the invention.

FIG. 1 shows a perspective view of a portion of the antenna/detector array 36 of the invention, while FIG. 2 shows schematically a plan view of a portion of a substrate 70 on which conductors 68 making up the individual elements 66 of the array 36 of antenna/detector elements are formed, and a portion of the associated circuitry. Array 36 comprises a plurality of substantially identical imaging antenna/detector elements 66. Each imaging element 66 comprises a balanced pair antenna which may be formed directly on a non-conductive dielectric substrate such as Kapton (TM) in turn supported on alumina panels 70, which are spaced from one another by a precision spacer member 72. The outline of the antenna elements 68 in a preferred embodiment is shown in FIG. 2. As indicated, the antenna elements 68 each comprise two spaced conductors 68 each comprising parallel portions 73 which extend a distance into the array 36 (the incident radiation being received endwise in the view shown in FIG. 1), curved portions 74 which approach one another along an exponentially curved outline, and further portions which are separated by a slot 76 and extend for another distance.

Such antenna elements 66 are referred to in the art as "endfire traveling wave slot antennas", as originally described by P. J. Gibson, "The Vivaldi Aerial", Proc. of the European Mic. Conf., Brighton, UK (1979), pp. 101-105. A nonlinear circuit element 80, such as a diode, is connected across the pair of conductive elements 68 of each antenna 66. In a preferred embodiment of the device of the present invention, the imaging array 36 may comprise an array 100×100 of antenna/detector elements 66, resulting in 10,000 identical antenna/detector elements 66 in the overall array 36. This is adequate to provide quite reasonable resolution, for example, to produce an image of a field of view.

The function of the non-linear circuit elements 80 varies somewhat depending on the embodiment of the invention. In the simplest embodiment of the invention (discussed further in connection with FIGS. 3 and 6), the antenna elements 68 detect millimeter wave radiation received from the field of view. The diodes 80 connected across the paired antenna elements detect and rectify the input energy, and provide an output signal which follows the envelope of the input millimeter wave energy. For example, suppose that the field of view includes a number of objects emitting millimeter wave energy at a low level, and an EPIRB emitting millimeter wave energy at 94GHz and modulated by a 1KHz sine wave. The diode of the imaging element at the position in the array corresponding to the location of the EPIRB in the field of view will rectify the 94GHz signal, so that its output signal will simply be the 1KHz modulation signal. Similarly, the diodes of the other elements of the array 36 will output signals proportional to the overall millimeter wave energy received from the corresponding portions of the field of view. An image can then readily be formed which will clearly locate the relative position of the EPIRB in the field of view. The bandwidth of the energy detected is simply a function of the design of the conductive elements 68.

In a further embodiment of the invention, discussed in connection with FIGS. 4, 5, and 7-9, the diodes also mix a local oscillator signal with the millimeter wave energy received from the field of view. As is well understood, the mixing process results in sum and difference components. The sum component is typically discarded. The difference component signal is processed to yield the signal intensity of the corresponding pixel of the image. Mixing of the local oscillator signal with the received energy in each element of the array greatly increases the signal-to-noise ratio of the system. If each imaging element of the sensor array of the invention in its simplest embodiment is analogized to a simple crystal detector radio set, then each imaging element of the sensor array in its embodiment in which a local oscillator signal is mixed with the received signal is comparable to a superheterodyne receiver.

It will be appreciated therefore that the diodes perform the rectifying (that is, an "envelope detection") function in all cases, and additionally perform the mixing function if the local oscillator signal is provided. Reference in the following to "mixer" diodes should be understood to include diodes solely performing the rectifying or envelope detection function unless the context indicates the contrary.

As indicated, each antenna/detector element 66 comprises a pair of conductors 68, each of which has a relatively thin forward section 73 extending toward the field of view, an exponential middle section 74, and a terminal slot 76 separating the two elements 68. Diodes 80 are connected across the conductors 68, as indicated by FIG. 2. In a preferred embodiment, slot 76 has two additional slots 78 extending from either side thereof and orthogonal thereto. These slots 78 comprise a radio frequency choke which reflects any unrectified millimeter-wave energy as well as the sum of the local oscillator and detected signals formed upon their mixing, while passing the difference signal.

As noted, the actual envelope detection and mixing functions are performed by a nonlinear circuit element, e.g., a diode 80, which is preferably physically disposed between the two conductive elements 68 of each element, that is, directly across the slot 76. In a preferred embodiment discussed in detail below, the diode 80 is formed directly on the substrate 70 without separate connecting leads.

After envelope detection and/or mixing of the local oscillator signal and the signal from the field of view by diodes 80, and filtering by the RF chokes formed by the slots 78, the signal which remains is a relatively "clean" intermediate frequency signal which can be amplified by conventional operational amplifiers 82 associated with each element 66 of the array 36. The output signals from amplifiers 82 can be supplied directly to the image formation or other radar signal processing circuitry 22 as indicated above.

FIG. 3 shows schematically the arrangement of each of the elements 8 of the array 36 in the first embodiment of the invention, wherein the array simply detects millimeter-wave energy received from the field of view (FOV). The signal 12 is detected by an antenna element 10 and rectified by a diode 4. The signal resulting is amplified by an amplifier 18 and is supplied together with a large number of like signals 20 to generally conventional image generation and signal processing circuitry 22.

Generally, all objects emit millimeter wave radiation, at frequencies and amplitudes which are functions of the temperature of the objects and their emissivities. Beacons 1 emitting millimeter wave radiation may also be provided. The "radiometric" sensor array described above is receptive to such millimeter wave radiation emitted by or reflected from objects in the field of view. Such an array of sensors could be used to provide a continuous image of a region over which an aircraft were flying. The image could be provided on a "head-up" display for the pilot's convenience. The scene could additionally be illuminated by millimeter-wave "landing lights" carried by the aircraft, and might also include millimeter wave beacons 1 at spaced locations on an airfield, for example corresponding to the common locations of runway and taxiway lights. These beacons 1 could also be sinusoidally or otherwise modulated in a manner readily detectable by the signal processing circuitry 22 by modulation means 2. Such a system would also be suitable for detection of millimeter wave energy received from a beacon 1 carried by a downed airman, a capsized sailor, or the like. In many such applications, it is anticipated that the sensitivity of the imaging array of the invention will be usefully increased by heterodyning the received energy with a local oscillator signal as discussed below.

It would also be possible to increase the signal-to-noise ratio of the signal from elements 8 as shown in FIG. 3 by connecting a storage element, indicated schematically as a capacitor 19, for storing the energy output by the diode 4. The energy could be accumulated over a relatively lengthy period of time and used to form a "still" image. The analogy in this case is to a time exposure in a still camera, wherein the shutter is left open for an extended period of time to enable image formation at low illumination levels.

FIG. 4 is a block diagram showing the individual signal processing components employed in each of a large number of mixer/detector elements 8 in the "superheterodyne" embodiment of the imaging device of the invention. A millimeter-wave oscillator 26 provides a local oscillator signal 14 which is mixed with the reflected radiation 12 to provide a lower frequency signal for convenience in signal processing, and to increase the signal-to-noise ratio with respect to the embodiment of FIG. 3. FIG. 5 is a block diagram of a similar system in which the energy 34 provided by the millimeter wave oscillator, used to provide the local oscillator signal, is also used to illuminate the field of view with millimeter-wave radiation. In both cases an antenna 10 detects radiation reflected from or emitted by objects in the field of view. Energy 12 detected from the field of view at frequency $f_{sig}$ and the local oscillator signal 14 at frequency $f_{LO}$ are combined in a mixer 16. The difference signal, at frequency $|f_{sig}-f_{LO}|$, is supplied to a video or radio frequency amplifier 18. The amplified signal, together with a number of similar signals 20 from other identical elements 8 of the array, is supplied to signal processing circuitry 22 for generation of an image, or other purposes.

More particularly, a large number, e.g., $10^4$, of the mixer/detector elements 8 shown schematically in FIGS. 3, 4 and 5 are arranged in a detector array, as generally shown in FIGS. 1 and 2. The signal output of each element 8 corresponds to a portion of the field of view; if an image is to be formed, each element 8 may be taken to correspond to one or several particular picture elements (hereinafter "pixels") of the image. In the case of the FIG. 3 embodiment, the signal is simply the "envelope" of the energy emitted by or reflected from objects in the field of view. In the FIGS. 4 and 5 embodiments, the signal output by each element 8 is a signal the frequency of which is responsive to the difference between the frequency of the received signal 12 and the frequency of the local oscillator signal 14. The amplitude of the image signals is approximately proportional to the amplitude of signal 12.

Accordingly, since a multiple element focal-plane array is used, a single image-forming element need not be scanned either mechanically or electronically over the field of view, or over, for example, the photo sensitive screen of a conventional video camera to generate a complete image. For example, an ordinary analog video signal can be generated simply by successively interrogating each of the imaging elements 8 along successive rows of the array of elements, as is done in cameras using a CCD imaging device.

It will be appreciated as well that the rectification or envelope detection and mixing functions (where mixing is performed) are provided by nonlinear elements which are integrally combined with each of the antenna elements 10 by which the energy is detected. Accordingly, no waveguide structure or like complication is required to combine the local oscillator signal 14 with the signal 12 received from the field of view. This greatly simplifies construction of the sensor according to the invention.

FIG. 5 shows an embodiment of the imaging array of the invention in which the energy output of a millimeter wave oscillator 26 is split into unequal parts. The minor portion is used as a local oscillator signal, while the major portion of energy 34 provided by oscillator 26 is transmitted as an illumination beam 24 onto the field of view. More particularly, the millimeter-wave energy signal 34 generated by the source 26 is linearly-polarized, such that it can be split into major and minor components 24 and 30 respectively by a polarizing grid 28. The major component 24 is employed as an illumination beam after reflection from the polarizing grid 28. The minor portion 30, which may include approximately 10% of the total signal energy output by the source 26, passes through the polarizing grid 28. It is then reflected from a twist reflector 32, which rotates its polarization through 90°, and back onto the grid 28, which reflects it toward the array of mixer/detector elements 8. The minor portion 30 thus becomes the local oscillator signal 14, which is then combined with the reflected signal 12 from the field of view.

The transmitted illumination signal is preferably swept in frequency as a function of time; when the reflected signal 12 is received, the local oscillator signal 14 is then at a slightly different frequency, such that the difference signal is non-zero.

Accordingly, it can be seen that in the FIG. 5 embodiment the energy 34 from oscillator 26 is used both as an illumination beam 24 to illuminate the object and as the local oscillator signal 14 which is mixed with the signal 12 reflected from the field of view 12.

Figure 6:
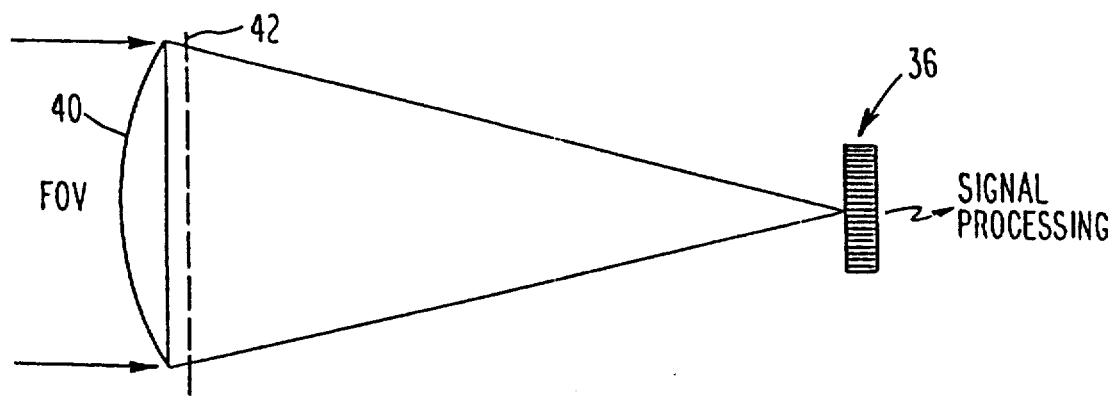
FIG. 6 shows the optical arrangement of an embodiment of the invention corresponding to FIG. 3.

FIG. 6 shows a possible optical arrangement of the millimeter wave imaging energy system corresponding to FIG. 3. A lens 40 (which could be replaced by a focusing mirror) collects millimeter-wave radiation from the field of view. An optional high pass filter 42 may be used to remove unwanted low frequency energy. The detector array 36 described in connection with FIGS. 1 and 2 is in the focal plane of lens 40; as indicated above, each element of array 36 outputs a signal corresponding to millimeter wave energy received from a corresponding portion of the field of view. A true focal plane array imaging system for millimeter wave radiation is thus described.

Figure 7:
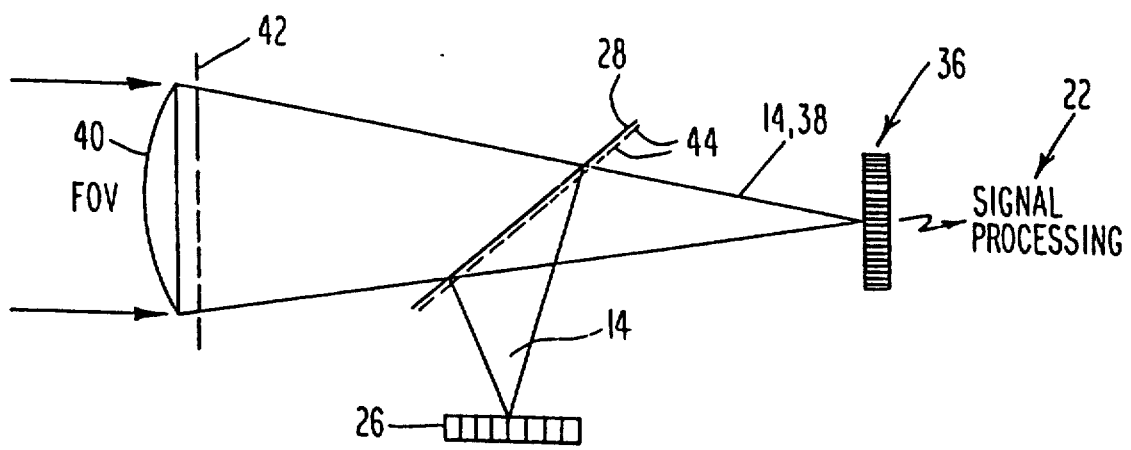
FIG. 7 shows the optical arrangement of the invention in an embodiment corresponding to FIG. 4.

FIG. 7 shows the corresponding view of the system of FIG. 4. In this case a source array 26 emits polarized millimeter wave energy which is incident on a polarizing grid 28 to be described below. This local oscillator signal is combined in array 36 with energy received from the field of view, generally as described above. FIG. 7 thus shows the optical arrangement of the "superheterodyne" detection system of the invention.

Figure 8:
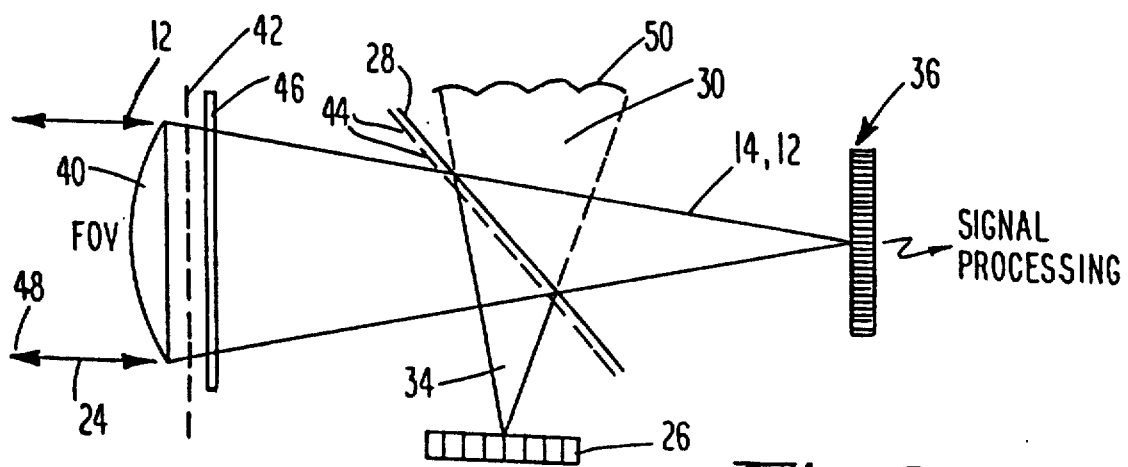
FIG. 8 shows an optical arrangement of the system in an embodiment corresponding to FIG. 5.
Figure 9:
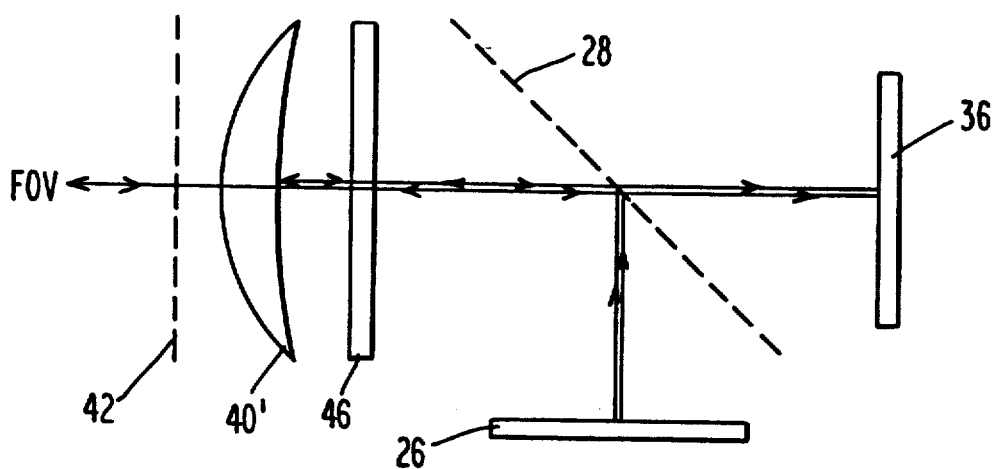
FIG. 9 shows an alternative embodiment of the optical arrangement of the system of the invention corresponding to FIG. 8.

FIG. 8 shows a possible optical arrangement of the millimeter wave signal detecting system discussed above in connection with FIG. 5. Incident radiation 12 reflected from an object in the field of view passes through lens 40, filter 42, a quarter-wave plate 46 to be described subsequently, and polarizing grid 28, after which it is combined with a local oscillator signal emitted by a source 26 of millimeter wave energy. As discussed above, the linearly polarized radiation 34 emitted by the source 26 is divided by the polarizing grid 28 into major and minor portions 24 and 30 respectively. The major portion 24, desirably including about 90 percent of the millimeter wave energy, passes outwardly as indicated at 48 to illuminate the field of view with millimeter wave radiation. The remaining minor portion 30 of the radiation 34 emitted by the source 26 is incident on a twist reflector 50. This device, which is described in connection with FIG. 13, has the property of rotating the polarization of the linearly polarized incident energy by 90°. Accordingly, when the twist reflector 50 reflects the minor component 30 of the radiation back onto the polarizing grid 28, it is then reflected towards the mixer/detector array 36, and becomes a local oscillator signal 14 for combination with the portion of the illumination beam 24 having been reflected from the field of view. An alternative arrangement is shown in FIG. 9.

Referring now to the design of the system elements shown in FIGS. 6, 7, and 8, the design techniques employed are generally referred to as "quasioptical" or as employing "Gaussian optics." These terms refer to the fact that the wavelength of the radiation is comparable to the aperture of the array elements, such that diffraction effects are highly significant, and conventional straight-line ray tracing techniques cannot be used. For example, lens 40 is generally as described in Goldsmith et al., "Gaussian Optics Lens Antennas", *Microwave Journal*, July 1984. The filter 42 is generally as described in Goldsmith, "Designing Quasioptical Systems", in *The Microwave System Designers Handbook*, Fifth Edition (1987), and may comprise a metal plate having an array of holes drilled therein to provide a high pass filter for the millimeter wave radiation of interest.

The polarizing grid 28 may comprise a series of parallel conductors spaced from one another by a dielectric medium. In a particularly preferred embodiment, the conducting members may be spaced parallel wires, e.g., of tungsten coated with gold, spaced in air. A less expensive alternative is to photolithograph flat conductive strips onto a dielectric substrate, e.g., Mylar TM. In either case, the orientation of the conductors (which are indicated generally at 44 in FIG. 2), with respect to the direction of polarization of the electric field of the millimeter wave energy 34 emitted by the source 26, determines the fraction 24 of the incident millimeter wave energy which is reflected from the grid 28; the remainder 30 passes through the grid 28.

More particularly, in a preferred embodiment, the spacing of the conductors 44 is approximately equal to or less than the wavelength of the millimeter wave radiation emitted by the source 26 divided by five. This grid 28 transmits the component of the linearly polarized electric field which is perpendicular to the direction of the conductors and reflects the portion which is parallel to their direction. If the conductors 44 are angled with respect to the direction of polarization of the radiation, a corresponding fraction passes through, and the remainder is reflected. Such components are commercially available from the assignee of this application for use in frequency selective devices.

As indicated, a quarter-wave plate 46 is typically interposed between the polarizing grid 28 and the lens 40. The quarter-wave plate 46 is a known component which converts a linearly polarized incident wave, such as that emitted by the source 26, into a circularly polarized wave. Such a circularly polarized wave may have more desirable reflection characteristics from an object to be imaged than the linearly polarized wave; for example, a linearly polarized wave can be reflected asymmetrically depending on the particular orientation of the object, whereas a circularly polarized wave has more uniform reflection characteristics. Upon reflection of the circularly-polarized wave from the object, the quarter-wave plate 46 will reconvert it to a linearly polarized wave, such that it will pass through the polarizing grid 28 without substantial attenuation. The quarter-wave plate may be manufactured from crystalline sapphire or by machining appropriate grooves into a dielectric material such as Rexolite TM.

Figure 13:
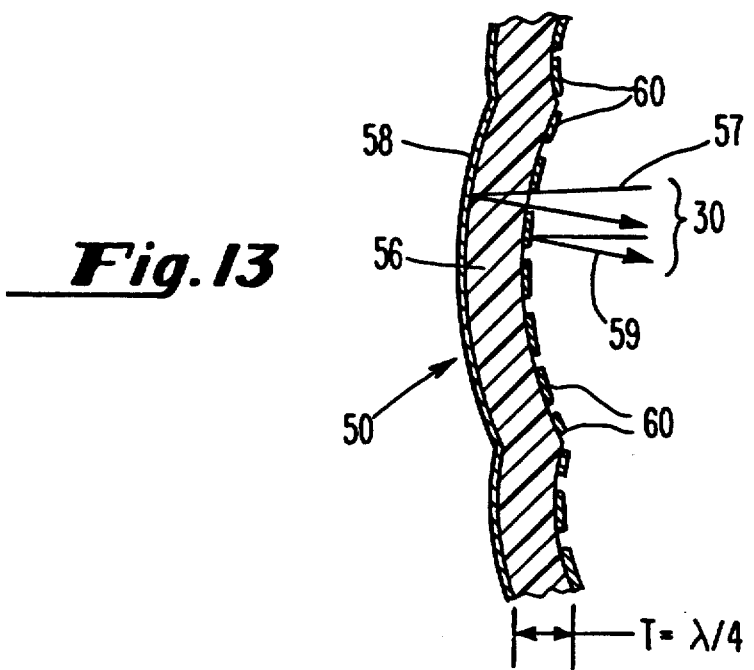
FIG. 13 shows a cross sectional view of a twist reflector which can be used in the embodiment of the invention described in connection with FIGS. 5 and 8.

The twist reflector 50 is shown schematically in FIG. 8 and in more detail in FIG. 13. The twist reflector 50 comprises a number of generally concave or dish-shaped elements arranged in an array. Preferably, the number of elements in this array is equal to the number of elements in the array of millimeter wave emitters making up source 26. The shape of the concave elements of the array 50 is such as to focus the divergent beams emitted by the elements of the source 26 onto a corresponding area on the surface of the array 36 of mixer/detector elements after reflection from the polarizing grid 28.

As indicated in FIG. 13, the twist reflector 50 comprises a dielectric substrate 56 coated on its rear side with a conductive layer 58, and on its front surface with a series of strips 60 of conductive material oriented at 45° to the direction of polarization of the incident wave. The thickness of the dielectric 56 is one-quarter wavelength, such that the effective travel distance of the wave through the dielectric is one-half wavelength. Accordingly, when a component 57 of the incident wave 30 which is reflected from the rear conductive layer 58 is combined with a component 59 directly reflected from the strips 60, they will be 180° out of phase. This is equivalent to rotating the direction of polarization of the incident beam by 90°. Accordingly, the beam 30 incident on the twist reflector 50 (which, it will be recalled, had passed through grid 28) is effectively rotated by 90° with respect to the polarizing grid 28. When the rotated beam is again incident on grid 28, it is, therefore, reflected onto the array 36. Preferably, the concave elements of the twist reflector 50 are square and are fitted into a mosaic, in which as mentioned each element corresponds to one of the emitters of the source 26.

FIG. 9 shows an alternative optical arrangement of the system of the invention in the FIG. 5 embodiment in which the twist reflector is eliminated. Again a transmitting array 26 located in the focal plane of the lens transmits linearly-polarized millimeter-wave energy onto a polarizing grid 28 which directs it towards a field of view (FOV). The transmitted energy travels through a quarter wave plate 46 which transforms it from a linearly polarized beam to a circularly polarized beam. The circularly polarized beam is then incident on lens 40' which in this case is a meniscus lens, that is, a concave-convex lens. The meniscus lens may be formed of materials such as Rexolite TM or Teflon TM. See the Goldsmith and Goldsmith et al articles discussed above. A portion of the incident radiation is reflected from the lens 40' and becomes the local oscillator signal. As is well known to those of skill in the art, the precise amount of the radiation reflected can be controlled as needed by the employment of known anti-reflective coatings on the surface of lens 40'. The remainder of the energy incident on lens 40' is transmitted therethrough to become the illumination beam. The quarter-wave plate 46 transforms the circularly-polarized reflected local oscillator portion of the beam back into a linearly-polarized beam, but at a polarization of 90° to the original energy, so that it passes through the polarizing grid 28 and is incident on the mixer/detector array 36. A high pass filter may again be employed as indicated at 42.

Accordingly, in this embodiment of the invention, the twist reflector 50 of FIG. 2 is replaced by the meniscus lens 40', which has the property of passing a major portion of the energy to become the beam which illuminates the field of view while reflecting a minor portion of the energy to become the local oscillator signal which is then incident on array 36.

In this embodiment of the invention, the polarizing grid 28 need not be aligned with respect to the polarization of the energy from the source array 26 in order to divide the energy into local oscillator and illumination portions; this function is provided by the intrinsic characteristics of the meniscus lens 40', optionally in conjunction with an antireflective coating as discussed above. Both the local oscillator portion of the energy from the source and the energy reflected from objects in the field of view pass twice through the quarter-wave plate 46. This provides a 90° change in polarization direction, so that the energy passes through the polarizing grid 28 and is incident on the mixer/detector array 36. One advantage of this design is that depending on various parameters it may be somewhat simpler to fabricate the meniscus lens than the twist reflector.

Other optical arrangements are possible. For example, a Faraday rotator can be substituted for the quarter wave plate in the embodiment of FIG. 9. The Faraday rotator is described in the Goldsmith article, "Designing Quasioptical Systems", referred to above. The Faraday rotator provides 45° rotation of the polarization beam such that both the minor local oscillator portion of the emitted energy and the energy reflected from objects in the field of view are rotated through 90° by the Faraday rotator. In this case, the illumination beam would be linearly polarized (rather then circularly polarized, as if the quarter-wave plate were used). This may be desirable, depending on the reflection characteristics of the objects to be imaged.

A further possibility would be to provide a Faraday rotator and mirror combination in place of the twist reflector described in connection with FIG. 8. Again this combination would have the function of reflecting the local oscillator portion of the beam and rotating its polarization through 90°, such that on its second incidence on the polarizing grid 28, it would be reflected therefrom and become a local oscillator signal for mixing with the received signal from the field of view in the array of mixer/detector elements 36.

Figure 10:
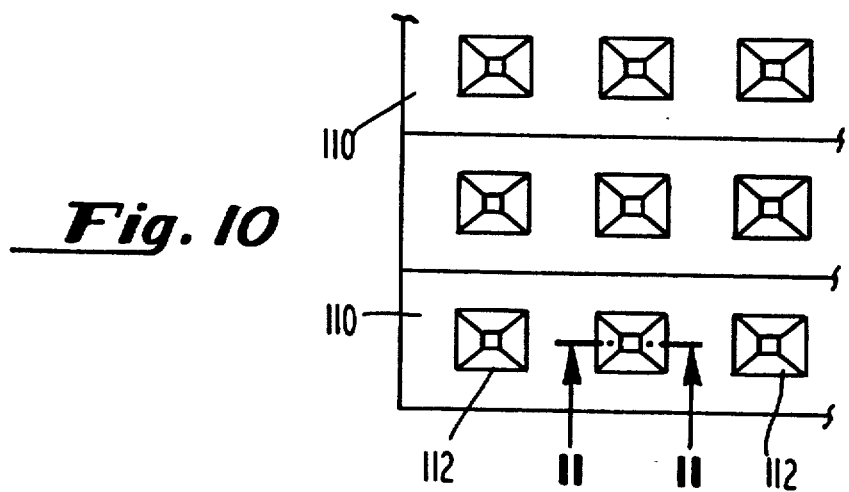
FIG. 10 shows a plan view of an array of a first embodiment of millimeter wave oscillators which can be used as a source of millimeter wave energy.

FIG. 10 is an end-on view of one embodiment of the source oscillator array 26, in which waveguide oscillators are used. A second embodiment of the source array, in which millimeter-wave integrated circuits are employed, is discussed below in connection with FIG. 14. Both embodiments of the source can also be employed as millimeter wave beacons, in EPIRBs, and elsewhere.

Figure 11:
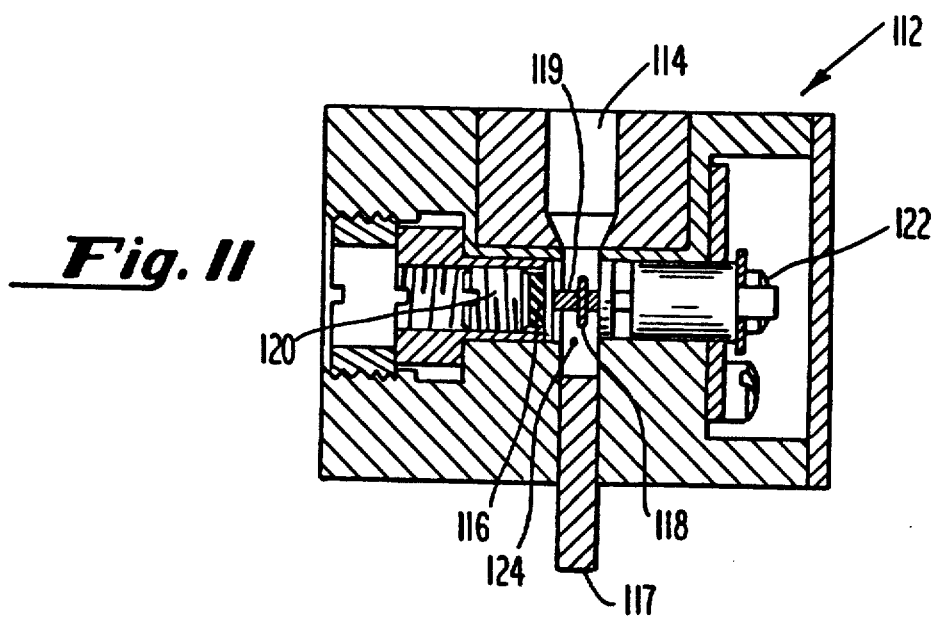
FIG. 11 shows a cross sectional view taken along the line 11—11 of FIG. 10.

The array of FIG. 10 comprises a number of identical elements 112. FIG. 11 is a cross section taken along line 11—11 of FIG. 10, and shows a detail of one of the elements 112 in the source array 26. Each element 112 comprises a linear oscillator cavity 114 including an integral radiator horn output section. The active element is a Gunn diode element 116, the construction of which is generally conventional. The cavity comprises a radial disc resonator 118 located along a coaxial RF choke structure 119 which supplies DC bias to the Gunn diode element 116. A fixed backshort 117 is used to optimize the performance of the basic oscillator. This type of element is referred to in the art as a "waveguide cavity resonator" which is driven by the Gunn diode.

As can be observed from FIG. 11, the diode element 116 is compressed by a threaded member 120 into the resonator structure 119. The center frequency of the Gunn diode oscillator is determined by the diameter of the resonator disc 118; minor adjustments to its frequency can be provided by mechanical tuning rod 124. The bias voltage of the InP Gunn diode can be varied in order to transmit millimeter wave energy at frequencies varying by approximately ±300 MHz at 95 GHz. For example, where the sensing array of the invention is to be configured as a radar detector a "sawtooth" waveform is convenient; to produce this, the bias voltage is accordingly varied in a sawtooth fashion. If needed, additional tuning can be provided by introducing a dielectric material such as sapphire into the vicinity of the resonant disc 118. Typical continuous-wave radiative power levels for the device are 100 mw/emitter at 95 GHz.

As discussed above, it is also possible to form the millimeter wave sources on the same substrate as the radiating antenna elements. Such microwave integrated circuit (MIC) devices may prove economically preferably to those shown in connection with FIGS. 10 and 11 in a number of applications.

An MIC millimeter wave oscillator typically utilizes a discrete-package Gunn diode device mounted on a conductive base plate which supports a dielectric substrate on which the printed circuit components of the oscillator are formed. See generally, Rubin, "Varactor-Tuned Millimeter-Wave MIC Oscillator, "*IEEE Trans. on Microwave Theory and Techniques*, 866–867, Nov. 1976.

There are three essential planar components of each MIC oscillator:

(1) A resonator, to establish the operating frequency;
(2) A bias network, to provide DC voltage to the diode, without interfering with the oscillator operation; and
(3) An output network to extract the power from the Gunn diode and match the impedance of the load circuit.

FIG. 14 shows a number of different resonant circuit geometries in configurations which may be appropriate in various circumstances. Typically a planar resonator is formed which comprises a conductive member having a dimension equal to one-half or one full wavelength at the intended operating frequency of the device. The resonator in conjunction with the Gunn diode establishes the operating mode and operating frequency of the oscillator. The bias network typically comprises a low pass filter of alternating high and low impedance transformer sections, each being approximately one-quarter wavelength long. The output network consists of a power coupling arrangement for coupling a "microstrip" transmission line to a suitable antenna. Where the antenna is also planar, for example, when a transmitting antenna similar to the receiving antenna discussed above in connection with FIGS. 1 and 2 is used, no coupling structure per se is needed, and the antenna elements can be formed directly on the same substrate as the oscillator itself.

FIG. 14(a) shows such an assembly. The antenna elements of the oscillator 200 and 202 are essentially similar to those discussed above in connection with FIGS. 1 and 2. Large numbers of these assemblies can be formed on a single substrate, and plural substrates stacked to form a multiple-element millimeter-wave source array. Such a source can be used as a millimeter wave beacon, or as a source of linearly-polarized local oscillator and illumination energy.

Figure 15:
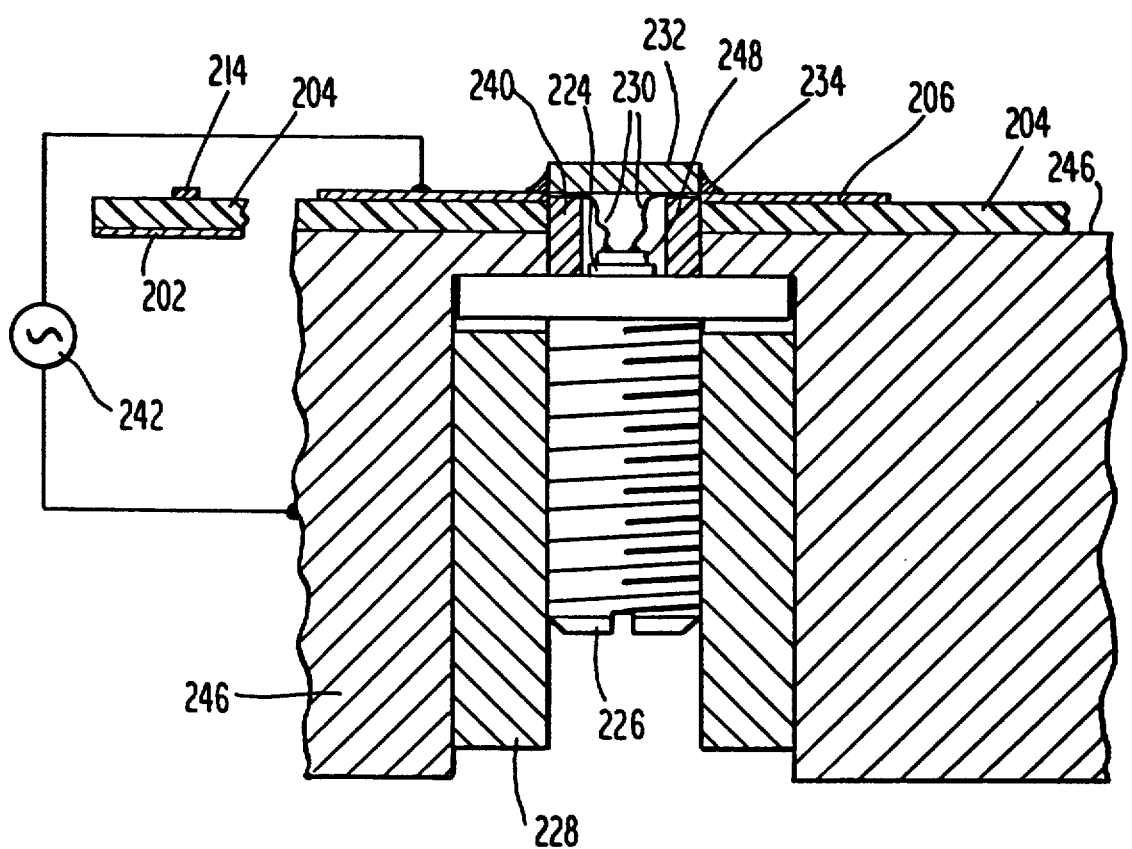
FIG. 15 shows a cross-sectional view along the line 15—15 of FIG. 14.

The oscillator section 204 comprises a conductive resonator 206 formed on a dielectric substrate 208. A Gunn diode 198 is assembled to the resonator 206 in a manner discussed below in connection with FIG. 15, which is a cross-section taken along the line 15—15 of FIG. 14(a). The bias network comprises enlarged conductive areas connected to the resonator 206 as indicated at 210; these comprise an RF filter choke which prevents the microwave energy from propagating toward the positive bias voltage connection, which is indicated at 212. Negative bias is provided to the conductive block on which the circuit is formed, as indicated in FIG. 15. Modulation of the output millimeter-wave energy is accomplished simply by modulation of the bias voltage.

An output structure comprising a conductor indicated at 214 couples the oscillator to the paired conductive elements 200 and 202 of the antenna. The conductor 214 extends over the ends of the conductive elements 200 and 202, and is spaced from them by the dielectric substrate 204 (see FIG. 15). The end of the conductor 214 extends past the slot between the conductive elements 200 and 202 a distance equal to the operating wavelength of the system divided by four, and the end of the slot extends a similar distance past the conductor 214, as indicated.

FIGS. 14(b) and (c) show alternative embodiments of the oscillator structure. Those shown in FIGS. 14(b) and (c) shows circular resonators 220, and semicircular RF choke elements 222; the operation of these devices is essentially similar to that of FIG. 14(a). The principal resonant mode of the circular oscillator is circular, while the rectangular resonator 206 shown in FIG. 14(a) has a linear principal oscillation mode. The circular oscillator 220 is coupled to the antenna elements similarly to that of FIG. 14(a), as indicated by the dotted lines.

FIGS. 14(d) and (e) show alternative arrangements of a millimeter-wave source having a rectangular resonator as shown in FIG. 14(a). Again, the selection between these can be made in accordance with well-understood engineering principles and according to the desired layout of the device on the circuit substrate.

The millimeter-wave oscillators shown in FIGS. 14(a)–(e) may also be employed to drive a waveguide-type transmitting antenna, if desired. In such case, the end of the network output lead 214 can be simply extended endwise through a slot in one wall of a rectangular waveguide, that is, into its interior cavity. The plane of the planar network output lead 214 is arranged to be parallel to the direction of the waveguide.

FIG. 15 shows, as mentioned, a cross-sectional view along the line 15—15 of FIG. 14(a), that is, through the actual diode structure itself. The conductive resonator 206 is disposed on the dielectric substrate 204 which in turn is disposed upon a heavy brass block 246. A standard Gunn diode package, comprising a diode chip 248 on a conductive pedestal 224 formed integrally with a threaded conductive heat sink member 226, is threaded into the block 246 by way of intermediate bushing member 228. The objective of this structure is to provide a high heat sinking capacity to the chip 248. The chip 248 is connected by plural bonding wires 230 to a diode cap 232 which is soldered as indicated at 234 to the resonator 206. Plural leads 230 are provided to reduce the impedance of the connection between the diode cap 232 and the chip 248. The spacing of the cap 232 from the ground plane, which is established by the threaded heat sink 226, is important to reduce the shunt capacitance of the structure. An alumina spacer ring 240 separates the diode cap 232 from the threaded heat sink member 226 by the proper amount.

Bias voltage is supplied as indicated at 242 to drive the diode and cause it to oscillate at the resonant frequency of the device shown. The bias voltage can be modulated to provide modulated output millimeter wave energy for a variety of purposes.

Figure 12:
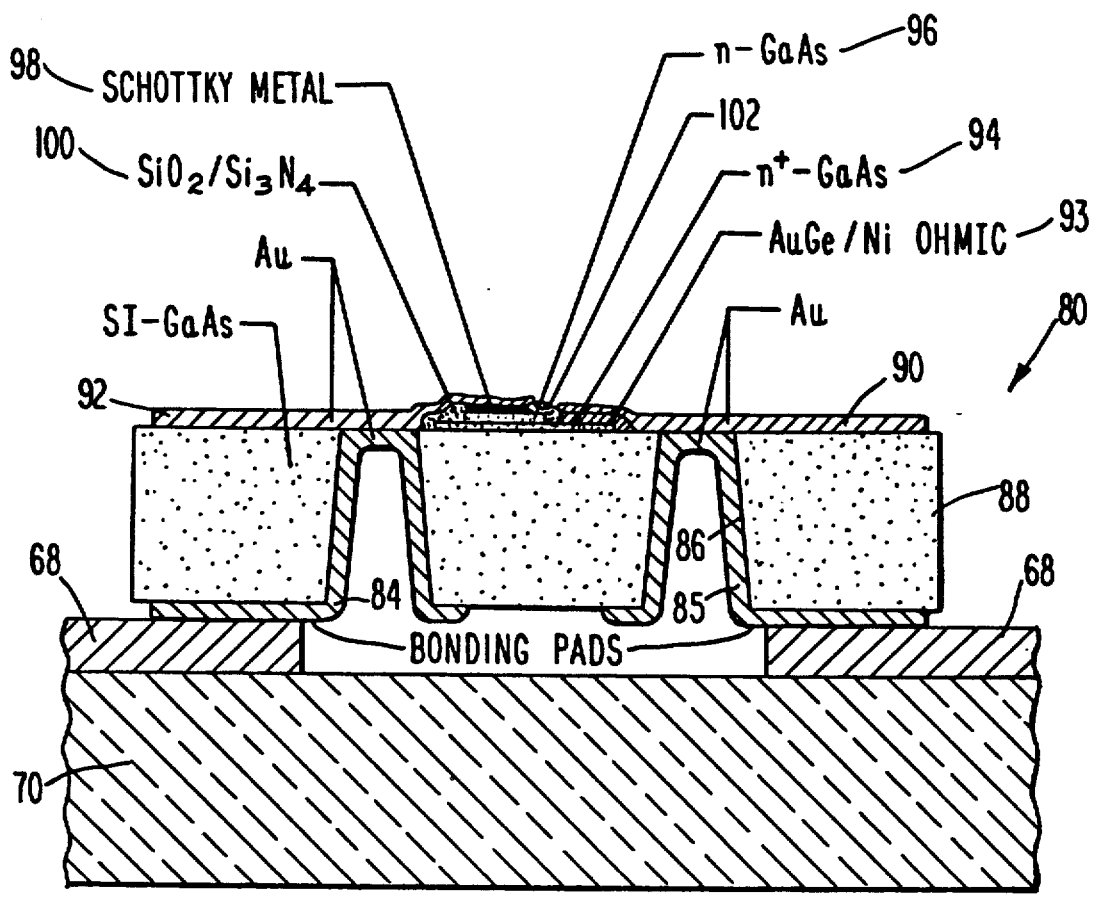
FIG. 12 shows a cross sectional view through a Schottky barrier diode which can be employed in each element of the imaging array of the invention.

As indicated above, there are engineering tradeoffs to be made in the selection of a millimeter wave energy source, and in particular, between the integrated circuit approach shown in connection with FIGS. 14 and 15 and the waveguide approach shown in connection with FIGS. 11 and 12. Hybrid structures using the FIG. 14 oscillator with waveguide rather than planar antennas are also feasible. At present, conventional waveguide Gunn diode oscillators as shown in FIGS. 10 and 11 are more expensive but provide higher output levels than the integrated circuit devices currently available. The applicants believe, however, that ultimately the integrated circuit devices described in connection with FIGS. 14 and 15 will be sufficiently powerful to be used in most of the applications for the present invention discussed in this specification. Furthermore, the production cost of the planar integrated circuit devices is sufficiently low, compared to the three dimensional waveguide devices of FIGS. 10 and 11, that the integrated circuit devices can economically be multiplied to yield any desired output power level. Savings in space and weight are also expected to be realized by employment of the planar construction shown in FIGS. 14 and 15.

Selection of an operating wavelength and frequency for the system according to the invention involves several design tradeoffs. The characteristic atmospheric absorption dictates operation in either the 1.2 mm, 2 mm or 3 mm wavelength band. Aperture size is reduced for smaller wavelengths, encouraging miniaturization of antenna components, but mixer performance decreases at the higher frequencies concomitant with smaller wavelengths. At present, the optimum frequency is considered to be 94 GHz (3 mm wavelength) or 140 GHz (2 mm), but this could change as better components (principally mixers and sources) become available or are invented. At these frequencies, atmospheric attenuation, including that due to water vapor, need only be considered in connection with very long range imaging systems.

FIG. 12 shows a cross-sectional view through one of the mixer diodes 80 which are preferably formed directly on the substrate 70 on which are formed the conductors 68 making up each of the antenna elements 66. In this embodiment, the diode 80 comprises bonding pads 84 and 85 which may be formed of gold and extend through vias (that is, through-holes) 86 in a semi-insulating (SI) GaAs substrate 88. The gold bonding pads 84 and 85 contact further additional gold electrodes 90 and 92 formed on the opposite side of the substrate 88. Electrodes 90 and 92 overlay the actual diode structure. The diode structure comprises a first layer 94 of n+-GaAs which is in contact with the semi-insulating GaAs substrate 88. Over this is formed an n-GaAs layer 96. Atop this layer 96 is provided a layer 98 of Schottky metal, which in a preferred embodiment may be Ti/Pt/Au. The Schottky metal layer 98 is directly in contact with electrode 92 and is thus in contact with bonding pad 84. The n+-GaAs layer 94 is in contact with the other electrode 90 and thus the other bonding pad 85 via an ohmic layer 93 of AuGe/Ni. Finally, an insulating/passivating $SiO_2/Si_3N_4$ material fills spaces 100 and 102 between the various layers. In a particularly preferred embodiment, the spaces 100 and 102 may also include an air gap between the electrode 92 and the GaAs layers 93 and 94, i.e., around the Schottky metal 98, with or without the $SiO_2/Si_3N_4$ material. This has the beneficial effect of reducing the parasitic capacitance of the mixer diode 80.

It will be appreciated that the structure described lends itself to ready fabrication directly on the substrate 70 carrying conductors 68 of the mixer/detector assembly, particularly as compared with a process involving assembly of conventional discrete diode elements, e.g., vertically-oriented or planar beam-lead diodes to the electrodes.

Ultimately, and subject to further developments in semiconductor materials and fabrication techniques, it may be possible to integrate the function of amplifiers 82 with that of mixer/detector diodes 80. This would require the development of amplifiers capable of operation at millimeterwave frequencies. It is envisioned that such devices could perform the mixing and amplification functions within a single semiconductive element. This would be highly desirable, as it would presumably substantially increase the signal-to-noise ratio of each mixer/detector element 66. The claims of this application are intended to include such improved devices, when they become available.

It will be appreciated that there has been described a millimeter wave signal detection device which comprises an array of mixer/detector elements, each adapted to provide an output intermediate frequency signal responsive to a local oscillator signal mixed with radiation reflected from a portion of a field of view. It will be appreciated that the mixer/detector array according to the invention is a "staring" array, that is, one which does not require mechanical or electronic scanning in order to provide an image of an entire field of view.

More specifically, at all times, the output signal from each of the antenna/detector elements of the array 36 corresponds to a portion of the device's field of view. For this reason, according to an important aspect of the present invention, it is not necessary that a detecting device be mechanically scanned with respect to the field of view, or that the transmitter be scanned, either by providing a phased-array of emitters or otherwise, in order that a complete image can be generated. Instead, the detectors each respond to millimeter wave energy from a portion of the field of view. This greatly simplifies generation of an image of objects in the field of view. Where illumination of the field of view is provided, as in the FIG. 5 embodiment, the entire field is illuminated uniformly, and without phase-encoding of the illuminating signal.

According to one aspect of the invention, the direction of an object from which radiation has been reflected can be determined directly responsive to identification of the one or more detector elements which detected the reflected radiation. That is, the position of the detecting element in the array which detects the reflected signal indicates directly the relative position of the reflecting object with respect to the array.

Where an illumination signal which is time varied with respect to frequency is employed, the distance of the reflecting object from the imaging array, and its relative velocity with respect to the array, can be determined using conventional radar signal processing techniques, after the signal has been detected according to the invention. For example, at pages 81-84 of Skolnik, op. cit., (which is incorporated by reference herein) there is provided a brief and succinct but complete description of the way in which distance and velocity information can be derived from reflection of a simple sawtooth transmitted signal. Essentially, the distance of the reflecting object from the array is determined simply by measuring the transit time taken for the signal to reach the object, be reflected therefrom and be detected at the array, and dividing this time by twice the speed of light c. The travel time of the reflected signal is readily determined as a function of the difference in frequency between the local oscillator signal being transmitted at a particular time and the frequency of the reflected signal. Hence, the travel time of the signal can be determined proportional to the rate of change of frequency of the transmitted signal.

Derivation of the relative velocity of the object with respect to the array can also readily be derived from relative frequency information contained in the reflected signal, as indicated by Skolnik. As is well understood, the relative frequency of the signal reflected from a moving object varies with respect to a stationary object at the same azimuth and elevation according to the Doppler effect. Relative motion of the reflecting object toward the array increases the apparent frequency shift, and motion of the object away from the array decreases the frequency shift. This effect can be distinguished from frequency shift in the reflected signal with respect to the transmitted signal due to distance therebetween by employment of the sawtooth transmitted signal, and comparison of frequency shift in successive portions thereof. As shown in Skolnik, op. cit., FIG. 3.12, this fact can be used in a manner well understood by those of skill in the art to monitor the velocity of objects within the field of view of the system of the invention.

Other conventional radar signal processing techniques are also within the scope of the invention, where not specifically described.

Any of a wide variety of image processing and image enhancement and analysis techniques may be combined with the signal generation and processing techniques according to the invention, such as convolution, false coloration, and identification of individual objects in the image both by comparison to known shapes and otherwise. Note in this connection that the fact that the image signal is provided pixel-by-pixel by the staring array of the invention makes it particularly amenable to many image processing techniques, especially those involving Fourier transformation. Such teachings, which are now or later fall within the skill of the art, are considered to be within the scope of the invention if not excluded by the following claims.

The basic system components provided according to the invention, that is, the millimeter-wave imaging "technology" of the invention, having thus been described in detail, some of the applications of this technology and these components to particular problems can now be discussed.

As indicated in several examples above, a principal object of the invention is to provide a real time imaging system for use in aircraft applications to provide an image of a runway despite the presence of atmospheric constituents such as fog, snow, blowing sand or dust, chemical gases, and the like. In the first embodiment of such a system, an airplane can simply be fitted with a radiometric millimeter wave detector array, preferably the superheterodyne type illustrated in FIG. 4, in which a local oscillator signal is employed to increase the signal-to-noise ratio of the array. Such a system can provide a video image of the field of view, e.g., up to several miles ahead of the aircraft. In a noncombat situation, that is, where there is no detriment to transmitting millimeter wave energy from the aircraft, the FIG. 5 embodiment of the system of the invention can be employed, in which the oscillator used to provide the local oscillator signal is also used to illuminate the field of view. Millimeter wave "landing light" sources can also be mounted on the airplane wings to illuminate the field of view.

In a particularly preferred embodiment of this system millimeter wave runway lights comprising millimeter wave sources as described above are provided in positions on the airport corresponding to those in which colored runway lights are now disposed. The millimeter wave energy emitted by these runway lights can be modulated to be encoded, which would enable processing electronics aboard the airplane to distinguish one type of runway light from another. A head-up display can then be provided to the pilot, using this information to provide colored symbols corresponding to those normally seen by the pilot on landing visually. The modulation signal provided to the millimeter wave landing lights can be a simple sine wave of a predetermined frequency an on/off binary code, or any other known code suitable for modulation of a continuous-wave (CW) signal. Reflectors of millimeter wave energy (simply comprising metal corners as in the case of conventional radar reflectors) could be disposed on the runway, to define highly reflective and hence readily visible positions on the airfield.

Another application of the technology provided according to the invention is that of rescuing downed airmen or capsized sailors. There are now available emergency position indicating beacons (EPIRBs) which transmit at radiofrequencies when the beacon hits the water. These provide a "fix" to a suitable radiofrequency detector, but the wavelengths of the radiofrequency signals are so long that accurate position indication cannot be derived. Accordingly, present day EPIRBs are suitable only for bringing a rescue craft into the vicinity of the individual; visual observation must then be made in order to actually effect the rescue. Rescue in fog is then impossible.

According to the invention, an EPIRB may be provided with a millimeter wave source as well. Since millimeter waves have substantially shorter wavelengths than radio waves, the corresponding millimeter wave detecting array is suitable to produce an image indicating the precise position of the beacon of the individual to be rescued. It is envisioned that such a system would be sufficiently accurate to enable a helicopter to directly approach a downed airman or capsized sailor and lower a life jacket or the like directly from above, even in visually impenetrable fog. In this case, the FIG. 4 superheterodyne receiver array would normally be used; use of the millimeter wave emitting beacon would eliminate any need to illuminate the scene and betray the presence of the rescue craft.

Millimeter wave sources and detectors according to the invention could also be used for interdiction of drug trafficking or possibly for detection of plastic weapons not detectable by x-ray detectors at airports. Both these possible uses of the technology provided by the invention rely on the fact that millimeter waves are attenuated to a given degree by dielectric materials. For example, the presence of a quantity of marijuana in a bulk dielectric material, for example, a bale of some other vegetation, could be detected by placing a millimeter wave source on one side of the bale and a detector on the other. Unless the dielectric constant of the marijuana were adjusted to be precisely equal to that of the vegetation, a detectable signal change would occur, indicating that the material was not homogeneous. An imaging device could be arranged to display the relative position of the material within a much larger quantity of vegetation. In the same manner, large quantities of dielectric materials could be inspected for the presence of weapons, contraband, and the like. Such a system could be used to inspect the holds of grain-carrying ships and the like.

Plastic weapons detection could also be provided by the system of the invention. Plastic weapons are hard to detect using conventional x-ray detection systems because the materials of which they are made of are almost transparent to x-rays. However, the dielectric constant of the materials of such weapons is likely to be such that millimeter wave radiation is attenuated or reflected differently thereby than by, for example the human body. Hence, a millimeter wave source/detector array combination could be added to the x-ray inspection equipment now in use at airports, to enable detection of such weapons.

More broadly still, the invention contemplates provision of a millimeter wave source wherever a light is now installed to permit night-time use of a transportation facility, together with an image display device on the corresponding vehicles. In an airport, for example, runway approaches, runways themselves, taxiways and docking areas would all be provided with millimeter wave sources which would be encoded (again, by modulation of millimeter wave radiation) such that a video display provided the pilot could be false-colored to correspond to the normal colors of these lights under clear sky conditions.

Similar applications for the technology provided according to this invention exist in ship berthing lights, ship running lights, and obstruction warning lights placed at the tops of buildings and bridges, and on lighthouses and other navigational aids, such as channel markers in waterways. In general, in any application where a visible light is provided presently to allow operations at night and wherein atmospheric constituents such as fog, snow, blowing sand or dust, etc. now interfere with such operations, a millimeter wave source can be provided. A corresponding millimeter wave detector can be added to the vehicle or other operational entity (such as a stationary traffic monitoring imager, for use by an air traffic controller, for example) to enable safe operation even in the presence of such atmospheric constituents.

For example, oil drilling rigs are essentially completely dependent on helicopters for personnel movement. Fog, snow, and rain are common in the North Sea, for example, and very substantially impede these operations. Simply fitting the drilling rigs with millimeter wave beacons and the service helicopters with millimeter imaging wave systems according to the invention, for example, employing the FIG. 4 superheterodyne array, would substantially reduce interference with such operations caused by fog and the like. The same of course would be true for other heliports.

The fact that millimeter waves in certain frequency bands are attenuated by the atmosphere can also be used to advantage. For example, one disadvantage of using a millimeter wave beacon as a runway light on an aircraft carrier would be that this would provide a millimeter wave emission which could be detected by a combatant. By designing the millimeter wave source to operate in a region of relatively high attenuation, e.g., at 120GHz, the range of the millimeter wave radiation emitted thereby would be limited to a few kilometers. This would not interfere with normal landing applications, since pilots returning to their ship would know to within a few kilometers where it was, so that this limited range would be adequate for effective landing assistance. The same considerations would apply to using millimeter wave beacons to define a temporary landing field without revealing its location to combatants monitoring millimeter wave frequencies.

Other application of the millimeter wave imaging technology described in this application will occur to those of skill in the art. As indicated above, substantially any imaging application in which atmospheric constituents obscure visible or infrared transmission can proceed regardless through the use of millimeter wave imaging technology. For example, a radiometric millimeter wave imaging system, preferably employing a local oscillator to increase its sensitivity, would be directly applicable to protection of the perimeter of a enclosed area, such as a military installation. The field of view could be illuminated using the FIG. 5 embodiment of the invention if need be to ensure an adequate signal-to-noise ratio. Similarly, millimeter wave imaging technology provided according to the invention could be used in various airborne and satellite-borne reconnaissance operations; a principal advantage would be that clouds and adverse weather conditions would not affect the imaging of the field of view.

The "radiometric" embodiment of the invention shown in FIG. 3 and 4, that is, in which the field of view is not illuminated, has the significant advantage in the military context that the imaging system does not emit any radiation which can be detected by a combatant and used to home a missile or other ordnance on the imaging device. This has obvious advantages.

Most of the applications of the millimeter wave imaging technology described above have involved simply generating an image of the field of view which would be comparable to that visible to the eye if the scene were fully lit. According to a further aspect of the invention, and as described in connection with the embodiment of FIG. 5, the local oscillator signal can also be time-varied and transmitted into the field of view as an illumination beam. When the illumination beam is reflected from objects in the field of view, information contained in the frequency modulation thereof can be used to derive information concerning the relative position, velocity and range of objects in the field of view.

More particularly, the system of FIG. 5 can be employed together with any conventional radar signal processing apparatus and using conventional radar signal wave forms to provide a millimeter wave radar image. This would have applicability to vehicle collision avoidance, in navigation, and in operation of robot armored vehicles, and in other applications which will be apparent to those of skill in the art.

Furthermore, while the invention has been described principally in connection with providing an image corresponding to the field of view of a millimeter wave sensing array, it should be appreciated that imaging per se is not a requirement of all claims of this application. Use of the millimeter wave sensing technology provided according to the invention is considered within its scope even in cases where an image corresponding to the field of view is not made per se, where not excluded by the following claims.

Therefore, while several preferred embodiments of millimeter wave components provided by the invention have been described above, together with several applications for their use, these should not be considered to limit the invention. The invention is to be limited only by the following claims.

We claim:

1. A millimeter wave imaging sensor, comprising:
   an array of sensing elements, each comprising an antenna element consisting of a pair of conductive elements, said conductive elements being adapted to detect millimeter wave radiation, and a nonlinear circuit element connected across each pair of conductive elements for rectifying millimeter wave radiation detected by said pair of conductive elements; and
   means for focusing millimeter wave radiation from a field of view onto said array, said means for focusing being aligned along an optical axis with said array of sensing elements;
   an oscillator for emitting linearly-polarized millimeter-wave radiation, disposed off said optical axis;
   a polarizing grid on said optical axis for dividing said radiation emitted by said oscillator into major and minor components, and for directing said major component of said radiation into the field of view, said minor component of said radiation passing through said polarizing grid; and
   means for rotating the polarization of said minor component and reflecting it onto said polarizing grid, whereby said polarizing grid reflects said minor component onto said array of sensing elements as a local oscillator signal.

2. The combination of claim 1, wherein said means for rotating is a twist reflector.

3. The combination of claim 1, wherein said means for rotating is a Faraday rotator in combination with a mirror.

4. The combination of claim 1, wherein said sensing elements of said array each comprise an endfire traveling wave slot antenna each consisting of one of said pairs of conductive elements, and said nonlinear circuit element is connected across said pair of conductive elements.

5. The combination of claim 4, wherein said nonlinear circuit elements are Schottky barrier diodes.

6. The combination of claim 5, wherein each said antenna element comprises two planar conductors spaced from one another on a dielectric substrate, defining a slot between said conductors generally aligned along the optical axis between said field of view and said detector.

7. The combination of claim 6, wherein each of said sensing elements further comprises an RF choke.

8. The combination of claim 7, wherein each said RF choke comprises one or more slots in each of said planar conductors extending generally orthogonally with respect to said slot between said planar conductors.

9. The combination of claim 8, wherein the diode of each element is formed on a planar substrate and comprises an active semiconductor member which is contacted by said conductor members, and wherein said conductor members are directly bonded to the planar conductors of the corresponding antenna.

10. The combination of claim 1, wherein the frequency of said energy emitted by said oscillator means is time varied, and said array is connected to means for processing the signals provided by each of the sensing elements to provide an image of the field of view which includes information responsive to the relative direction, range, and velocity of objects in the field of view which reflect the energy emitted by said oscillator means.

11. The combination of claim 1, in combination with means for receiving the signals emitted by each of the sensing elements and for generating a image responsive thereto, wherein each pixel of the image corresponds to one of the elements of the array.

12. A method of generating a millimeter wave image of objects in a field of view, comprising the steps of:
   focusing millimeter wave energy emitted by or reflected from the objects in said field of view onto an array of imaging elements, each of said imaging elements comprising antenna means for detecting millimeter wave energy received from a corresponding portion of said field of view;
   simultaneously illuminating said imaging elements of said array with an array of sources of local oscillator signal to provide a local oscillator signal of substantially uniform amplitude over the array;
   mixing the energy received from the corresponding portion of the field of view with the local oscillator signal separately for each of the imaging elements; and
   forming an image, essentially in real time, each pixel of which corresponds to the millimeter wave energy detected by one of said imaging elements of said array.

13. A method as set forth in claim 12, in which at least one of such objects is a beacon which emits millimeter wave radiation distinguishable by a particular encoding characteristic, said method further comprises the step of differentiating such beacon from other beacons and from objects in the field of view that are not beacons, on the basis of the particular encoding characteristic.

14. A system for providing a millimeter wave image of a field of view, comprising:
   a millimeter wave imaging sensor, comprising an imaging array of sensing elements, each comprising an antenna including a pair of conductive elements sensitive to millimeter-wave radiation, and a nonlinear circuit element coupled thereacross, and means for focusing millimeter wave radiation reflected by or emitted from objects in the field of view onto said elements of said array;
   an array of sources of local oscillator signal for simultaneously illuminating said sensing elements of said imaging array with a local oscillator signal of substantially uniform amplitude over the array; and
   image signal processing means for generating an image, essentially in real time, responsive to millimeter wave energy detected by said imaging elements of said array, wherein each pixel of said image is responsive to the signal provided by one of the elements of said array.

15. The system of claim 14, further comprising at least one source of millimeter wave radiation for illuminating objects in said field of view for detection by said array.

16. The system of claim 15, wherein said at least one source of millimeter wave radiation is carried by a vehicle carrying said imaging device for illuminating the field of view.

17. The system of claim 14, wherein said oscillator means additionally provides illumination radiation directed onto the field of view.

18. The system of claim 17, wherein the frequency of the energy provided by said oscillator means is varied as a predetermined function of time, and wherein said image signal processing means further comprises means for analyzing the signal detected by each of the elements of said array for detection of objects within said field of view and determination of their position, range, and velocity with respect to said imaging array.

19. A system for providing a millimeter wave image of a field of view, comprising:

a millimeter wave imaging sensor, comprising an array of imaging elements, each comprising an antenna consisting of paired conductive elements having a non-linear circuit element coupled thereacross;

means for focusing millimeter wave radiation reflected by or emitted from objects in the field of view onto said imaging elements of said array;

an array of sources of local oscillator signal for simultaneously illuminating said imaging elements of said array with a local oscillator signal of substantially uniform amplitude over the array;

image signal processing means for generating essentially in real time an image responsive to millimeter wave energy detected by said imaging elements of said array, wherein each pixel of said image is responsive to one of the elements of said array; and at least one millimeter wave radiation source illuminating a portion of said field of view, said source emitting radiation which varies according to a predetermined function of time;

wherein said image signal processing means comprises means for detecting radiation from the field of view response to the illumination from said source.

* * * * *